United States Patent Office 2,947,733
Patented Aug. 2, 1960

2,947,733
PROCESS OF CURING A RUBBERY COPOLYMER OF A CONJUGATED DIENE AND A CARBOXYLIC ACID OR ANHYDRIDE WITH DICYANDIAMIDE, AND CURED PRODUCT OBTAINED THEREBY

Byron H. Werner, Akron, and Robert J. Reid, Canal Fulton, Ohio, assignors to The Firestone Tire & Rubber Company, Akron, Ohio, a corporation of Ohio No Drawing. Filed Apr. 19, 1957, Ser. No. 653,753

5 Claims. (Cl. 260—82.1)

This invention relates to the curing of rubbery copolymers which contain a reactive carboxyl group. The cure is effected with dicyandiamide, $NH_2C(:NH)NHCN$.

These copolymer rubbers tend to scorch when cured by the usual means using sulfur and metal oxides. The term "scorch" is used herein as it is employed in the rubber industry to refer to the premature curing of a curable rubber stock. Thus, when such rubbers are compounded in the usual way and then worked in an extruder, prior to extrusion in the form of a tube or any other elongated shape, the heat of the extruder tends to cause premature curing so that the rubber becomes partially cured before it is extruded, and inferior products result.

The rubbery copolymers to which this invention relates are elastomers; that is, on curing they are converted from plastic materials to thermoset products having tensile strengths and elongations, etc., which resemble rubber to a greater or less degree. They contain from 0.03 to 0.4 chemical equivalent by weight of free or anhydride carboxyl groups (calculated as —COOH) per 100 parts by weight of copolymer.

A usual way of obtaining these rubbery copolymers is by copolymerization of two or more monomers which include at least one conjugated diene and one olefinically unsaturated carboxylic acid or carboxylic acid anhydride. The uncured copolymer contains one or more reactive carboxyl groups, part or all of which on curing may be converted to metal carboxylate groups or amides.

The conjugated dienes which can be used include, for instance, butadiene, isoprene, methylpentadiene, 2-chlorobutadiene, 2,3-dimethyl-butadiene, 2-cyanobutadiene, the straight-chain and branched-chain pentadienes and hexadienes, other straight-chain and branched-chain hydrocarbon dienes and halogen substituted derivatives thereof, piperylene, etc. The rubbery copolymers contain at least substantially 50 percent by weight of the conjugated diene.

The olefinically unsaturated carboxylic acid monomers which may be used include, for example, acrylic acid, methacrylic acid, crotonic acid, cinnamic acid, maleic acid, fumaric acid, itaconic acid, beta-acryloxy propionic acid, the vinyl acrylic acids, sorbic acid, oleic acid, undecylenic acid, ricinoleic acid, linoleic acid, alpha-butyl crotonic acid, hydrosorbic acid, beta-benzal acrylic acid, alpha-methyl sorbic acid, alpha-vinyl cinnamic acid, glutaconic acid, muconic acid, the mono- and di-alkyl sorbic acids, chloro acrylic acid, chloromethacrylic acid, etc.

The olefinically unsaturated carboxylic acid anhydrides which may be used include maleic anhydride, itaconic anhydride, and generally the anhydrides of the foregoing acids.

One or more other monomers may be used in the copolymerization including any monomer copolymerizable in this type of reaction, as is well known in the art. The following are listed as representative: acrylonitrile, chloroacrylonitrile, methacrylonitrile, alkyl esters of acrylic and methacrylic acids, vinylidene chloride, styrene, substituted styrenes, isobutylene, vinyl chloride, vinylidene fluoride, trifluoroethylene, perfluoropropene, etc.

If the rubbery copolymer is produced by copolymerization it will usually be obtained by emulsion copolymerization with a water-soluble free-radical-generating catalyst, as, for example, potassium persulfate, other peroxygen compounds, etc. It is known that these polymers may be obtained by other means, as by condensation, by hydrolysis of copolymers containing ester or amide groups, etc.

In preparing the rubber composition the dicyandiamide is mixed with the rubber in any suitable manner, usually with other compounding ingredients such as accelerators of vulcanization, antioxidants, coloring pigments, plasticizing oils, etc., and this is usually done in a rubber mill or a Banbury mixer. The dicyandiamide is used in finely divided form, such as is obtained by ball milling or spray drying. From 0.5 to 10 parts of the dicyandiamide will be used per 100 parts of rubbery copolymer. The rubber stock is then cured at an elevated temperature. The rubber can be heated in a mold by steam or other hot fluid, or it can be heated by a high frequency electrical field, or in any other desirable manner. Extruded products are generally cured in open steam. The chief requirements for a satisfactory cure with dicyandiamide are that the curing agent be very finely divided and intimately mixed with the rubber, and that the rubber mix be cured at a minimum temperature of substantially 140° C. Higher temperatures can be utilized up to 185° C., for instance.

The mechanism of the curing reaction is not understood. Various triazines, guanidines and melamines, and other decomposition products are formed during the cure which possibly react with the carboxyl group of the rubber to produce the cure. On heating to approximately 165° C. for substantially 15 to 45 minutes the cure obtained appears to be near the optimum.

The rubbery copolymer to which we refer herein as Copolymer No. 1 can be made as follows:

PREPARATION OF COPOLYMER NO. 1

The following were introduced into a stirred, heated autoclave after removal of the air:

| | Parts by weight |
|---|---|
| Butadiene | 85 |
| Methacrylic acid | 15 |
| Aquarex G [1] | 1.6 |
| Potassium persulfate | 0.3 |
| Water | 200 |

[1] Aquarex G is the sodium salt of a sulfonated paraffin hydrocarbon, manufactured by the Du Pont Company.

The polymerization was carried on at 50° C. to a conversion of 70 percent at which stage 0.2 part of hydroquinone was added to stop the reaction, and the polymer after washing on a corrugated mill was dried in an oven at 50° C. The properties of the copolymer and its chemical equivalent of combined free carboxyl groups can be varied by using different proportions of the monomers to produce copolymers containing 0.03 to 0.4 chemical equivalent by weight of carboxyl groups, viz. within the range of 70 to 98 percent of butadiene to 30 to 2 percent of methacrylic acid.

Other conjugated dienes and olefinically unsaturated carboxylic acids or carboxylic acid anhydrides can be similarly copolymerized, in varying proportions, with or without a third monomer.

The following examples are illustrative of the cure:

Example 1

A masterbatch stock was prepared as follows:

| | Parts by weight |
|---|---|
| Copolymer No. 1 | 100 |
| HAF Black | 35 |
| PBNA | 2 |

PBNA stands for phenyl-beta-naphthylamine which was used as an antioxidant; the black was used as a reinforcing agent.

The masterbatch was divided into 10 portions, one portion being kept as a control and different amounts of dicyandiamide per 100 parts of the rubber were added to the other portions and cured at 165° C. for different lengths of time as set forth in the following table. The physical properties of the resulting products are recorded in the table to indicate the relative effectiveness of the cures.

| Dicyandiamide, p.p.h. of Rubber | Cure Time, minutes | Tensile Strength (p.s.i.) | Percent Elongation | Shore A Hardness |
|---|---|---|---|---|
| 0 | 45 | 175 | 1,600 | 33 |
| 1 | 15 | 925 | 850 | 42 |
| 1 | 30 | 1,375 | 670 | 48 |
| 1 | 45 | 1,175 | 570 | 51 |
| 2 | 15 | 1,375 | 520 | 52 |
| 2 | 30 | 2,075 | 540 | 55 |
| 2 | 45 | 2,175 | 540 | 57 |
| 3 | 15 | 2,000 | 530 | 56 |
| 3 | 30 | 2,708 | 430 | 59 |
| 3 | 45 | 2,575 | 380 | 61 |

The above results indicate that when dicyandiamide is used alone as the curing agent, substantially three parts are generally most satisfactory, and at this temperature a curing time of 30 minutes gives near optimum tensile strength. The curing time may vary, commercially, from about 20 minutes to 2 hours, as is customary in the curing of rubber, and the temperature will be regulated accordingly.

The results show that with a 30-minute cure at a temperature of about 165° C., for example, or more generally at a temperature of 140 to 185° C. is most satisfactory. The use of lower temperatures with a 30-minute cure yields under-cured products of lower tensile strength, and higher temperatures produce bubbling unless special means are provided to prevent it.

Results were obtained which indicate that dicyandiamide of fine particle size gives the best results. The results recorded in the above table were obtained with dicyandiamide which had been ball milled for 16 hours in a small laboratory ball mill. With dicyandiamide of smaller particle size the following goods results were obtained with the same masterbatch stock as above, using only two parts of dicyandiamide, cured at 165° C. for 30 minutes:

| | |
|---|---|
| Tensile strength (p.s.i.) | 3100 |
| Percent elongation | 510 |
| Shore A hardness | 61 |

The dicyandiamide concentration should be kept as low as possible to minimize the tendency of the cured stock to bloom.

Example 2

The Mooney scorch at 265° F. was determined on the following stock:

| | Stock B, parts |
|---|---|
| Copolymer No. 1 | 100 |
| HAF Black | 35 |
| PBNA | 2 |
| Plasticizing oil | 6 |
| Dicyandiamide | 3 |

The Mooney $ML_4$ increased only 1⅔ Mooney units in 40 minutes at 265° F., indicating substantially no scorch tendency. Such a stock can be extruded without difficulty from scorching, and is suitable for tire treads because of its unusually good wearing properties.

After mixing the copolymer, etc. of Example 2 with a small amount of dicyandiamide in finely divided form, the mixture is worked at an elevated temperature in the extruder, an elongated product is extruded and thereafter heated to cure it. The curing time and temperature are set forth in Example 1.

Metal oxides and salts in combination with sulfur and other conventional curing agents tend to scorch carboxyl containing rubbery polymers, whereas the process of the invention produces excellent vulcanizates without scorching.

The examples are illustrative. The invention is covered in the claims which follow.

What we claim is:

1. The process of curing an elastomer which is an elastomeric copolymer of monomers comprising a conjugated diene and an olefinically unsaturated monomer from the class consisting of carboxylic acids and carboxylic acid anhydrides which contains from 0.03 to 0.4 chemical equivalent by weight of carboxyl groups of the class consisting of free and anhydride carboxyl groups per 100 parts of the combined weight of said diene and olefinically unsaturated monomer (calculated as COOH), which process comprises mixing the same with a small amount of dicyandiamide in finely divided form and then curing by heating to a temperature of 140 to 185° C.

2. The process of curing an elastomer of substantially conjugated diene and olefinically unsaturated monomer from the class consisting of carboxylic acids and carboxylic acid anhydrides, which elastomer contains from 0.03 to 0.4 chemical equivalent by weight of carboxyl groups of the class consisting of free and anhydride carboxyl groups per 100 parts by weight of elastomer (calculated as COOH), which process comprises heating the same to 140 to 185° C. with 0.5 to 10 parts of dicyandiamide in finely divided form per 100 parts by weight of elastomer and thereby curing the elastomer.

3. Elastomer of substantially 85 parts of conjugated diene and 15 parts of olefinically unsaturated monomer from the class consisting of carboxylic acids and carboxylic acid anhydrides, cured by the process of claim 2.

4. The process of treating an elastomer which is an elastomeric copolymer of monomers comprising a conjugated diene and an olefinically unsaturated monomer from the class consisting of carboxylic acids and carboxylic acid anhydrides which contains from 0.03 to 0.4 chemical equivalent by weight of carboxyl groups of the class consisting of free and anhydride carboxyl groups (calculated as COOH) per 100 parts of the combined weight of said diene and olefinically unsaturated monomer, which process comprises mixing the elastomer with a small amount of finely divided dicyandiamide, and while working a mass of the elastomer mixture at an elevated temperature in an extruder, extruding from the mass an elongated product, and thereafter heating the elongated product at 140 to 185° C. to cure it.

5. The process of claim 4 in which the elastomer is composed of at least 50 parts of butadiene.

References Cited in the file of this patent

UNITED STATES PATENTS

| 2,455,807 | Redmon et al. | Dec. 7, 1948 |
| 2,524,424 | Buret | Oct. 3, 1950 |
| 2,665,734 | Buchwalter | Jan. 12, 1954 |

FOREIGN PATENTS

| 666,640 | Great Britain | Feb. 13, 1952 |